(12) United States Patent
Li

(10) Patent No.: US 11,546,543 B2
(45) Date of Patent: Jan. 3, 2023

(54) IMAGE SENSOR AND SENSOR DEVICE FOR IMAGING TEMPORAL AND SPATIAL CONTRAST

(71) Applicant: INIVATION AG, Zürich (CH)

(72) Inventor: Chenghan Li, Zürich (CH)

(73) Assignee: INIVATION AG, Zürich (CH)

( * ) Notice: Subject to any disclaimer, the term of this patent is extended or adjusted under 35 U.S.C. 154(b) by 0 days.

(21) Appl. No.: 17/277,246

(22) PCT Filed: Aug. 2, 2019

(86) PCT No.: PCT/EP2019/070919
§ 371 (c)(1),
(2) Date: Mar. 17, 2021

(87) PCT Pub. No.: WO2020/057846
PCT Pub. Date: Mar. 26, 2020

(65) Prior Publication Data
US 2021/0352238 A1    Nov. 11, 2021

(30) Foreign Application Priority Data

Sep. 18, 2018   (EP) ...................... 8195192

(51) Int. Cl.
*H04N 5/369*   (2011.01)
*H04N 5/355*   (2011.01)
(Continued)

(52) U.S. Cl.
CPC .......... *H04N 5/379* (2018.08); *H04N 5/3454* (2013.01); *H04N 5/35518* (2013.01); *H04N 5/37455* (2013.01); *H04N 5/37457* (2013.01)

(58) Field of Classification Search
CPC ..... H04N 5/341–3456; H04N 5/35518; H04N 5/37455; H04N 5/37457; H04N 5/379
See application file for complete search history.

(56) References Cited

U.S. PATENT DOCUMENTS 6,828,540 B2   12/2004   Landolt
7,170,043 B2    1/2007   Heim et al.
(Continued)

FOREIGN PATENT DOCUMENTS

| KR | 10-2014-0138010 A | 3/2014 |
| KR | 10-2015-012263 0 A | 2/2015 |
| WO | WO 2017/174579 A1 | 10/2017 |

OTHER PUBLICATIONS

Kavadias, Spyros, et al., "A Logarithmic Response CMOS Image Sensor with On-Chip Calibration," *IEEE Journal of Solid-State Circuits*, vol. 35, No. 8, pp. 1146-1152 (Aug. 2000).
(Continued)

*Primary Examiner* — Paul M Berardesca
(74) *Attorney, Agent, or Firm* — Christensen, Fonder, Dardi & Herbert PLLC

(57) ABSTRACT

An image sensor for detecting time-dependent image data, comprising multiple photovoltaic converters and multiple electronic converters arranged in arrays and linked by switching elements. Each of the photovoltaic converters and one of the electronic converters form a pair that generates digital information dependent on light intensity on the photovoltaic converter. The switching elements are arranged to selectively connect at least two of the photovoltaic converters to one of the electronic converters and at least two of the electronic converters to one of the photovoltaic converters.

14 Claims, 6 Drawing Sheets

(51) Int. Cl.
  *H04N 5/3745*   (2011.01)
  *H04N 5/345*    (2011.01)

(56) References Cited

U.S. PATENT DOCUMENTS

| | | |
|---|---|---|
| 7,728,269 B2 | 6/2010 | Lichtsteiner et al. |
| 8,363,140 B2 | 1/2013 | Heim et al. |
| 9,171,875 B2 | 10/2015 | Hayashi |
| 9,509,332 B1 * | 11/2016 | Garrity ................. H03M 3/468 |
| 9,621,833 B2 | 4/2017 | Mabuchi |
| 9,631,974 B2 | 4/2017 | Delbruck et al. |
| 2014/0145288 A1 | 5/2014 | Hayashi |
| 2014/0263961 A1 | 9/2014 | Wang |
| 2014/0347442 A1 | 11/2014 | Wang et al. |
| 2016/0093273 A1 | 3/2016 | Wang et al. |
| 2017/0018593 A1 | 1/2017 | Qiao et al. |
| 2017/0353675 A1 | 12/2017 | Onuki et al. |
| 2020/0275043 A1 * | 8/2020 | Ma .......................... H04N 5/378 |
| 2020/0344428 A1 * | 10/2020 | Lee ......................... H04N 5/345 |

OTHER PUBLICATIONS

Carey, Stephen J., et al., "A 100,000 fps Vision Sensor with Embedded 535GOPS/W 256×256 SIMD Processor Array," *2013 Symposium on VLSI Circuits*, Kyoto, Japan, pp. C182-C183 (2013).

\* cited by examiner

IMAGE SENSOR AND SENSOR DEVICE FOR IMAGING TEMPORAL AND SPATIAL CONTRAST

RELATED APPLICATIONS

The present application is a National Phase entry of PCT Application No. PCT/EP2019/070919, filed Aug. 2, 2019, which claims priority to Euopean Patent Application No. 18195192.2, filed Sep. 18, 2018, the disclosures of which are hereby incorporated by reference herein in their entirety.

FIELD OF THE INVENTION

The invention relates to an image sensor and a sensor device for detecting time-dependent image data.

BACKGROUND OF THE INVENTION

A modern image sensor generally consists of an array of photovoltaic converters, connected to electronic converters. While the photovoltaic converters convert incident light into corresponding analog electric signals, the electronic converters convert these analog signals further into digital signals with the help of an analog to digital converters, in the following also called an encoders.

One type of image sensor, which encodes the temporal visual contrast of the scene captured by its photosensors, is proposed in U.S. Pat. No. 7,728,269 B2. By encoding the temporal contrast, temporal redundancy of the output data of the image sensor is almost eliminated, thereby producing activity-driven sparse data in the format of ON/OFF events. This means that each event consists of the sign ON/OFF and the pixel coordinates. However, the device proposed in U.S. Pat. No. 7,728,269 B2 is not able to capture any temporally static scene information.

To address the issue of capturing temporally static scene information, one may turn to U.S. Pat. No. 9,631,974 or Asynchronous Time-Based Image Sensor (ATIS) (Posch et al. 2010), which describe the static scene information being captured by a secondary dedicated intensity measuring circuit, which produces a second stream of output that encodes the static scene linearly. This two-stream approach adds complexity to the sensor, and results in two outputs that have little similarity to each other: one output encodes the temporal differences in the logarithmic value of incident light intensity, and hence the temporal visual contrast, while the other output encodes the absolute incident light intensity linearly.

There is known art describing a static scene being encoded logarithmically. E.g. according to "A Logarithmic Response CMOS Image Sensor with On-Chip Calibration" (Kavidias et al. 2000), the photocurrent generated by each photodiode is converted logarithmically into a voltage by exploiting the sub-threshold transistor physics. The logarithmic voltage is then measured. But the logarithmic conversion accuracy suffers from transistor mismatch, even after calibration. According to U.S. Pat. No. 8,363,140, the logarithmic conversion is achieved by combining a logarithmic digital counter with in-pixel single slope analog-to-digital converters. However, in this design, the pixel is too complex to be integrated into a temporal contrast pixel.

The concept of encoding a static scene by local spatial contrast has been proposed in U.S. Pat. No. 6,828,540, where an image sensor system is described, which uses a mechanically vibrating optical device to convert the spatial contrast of the scene into temporal variance of the incident light to the pixels, and encodes such temporal variance using a pulse density modulation based scheme. However, the mechanically vibrating optics requires additional mechanical parts not widely used in today's state-of-the-art image sensor systems. The mechanical vibrating optics needs additional components to provide precise positioning and timing control. The mechanical vibration also results in each pixel having a circular scanning pattern, which does not match the orthogonal pixel arrangement, hence making post processing the image less accurate.

Sensing the local spatial contrast can also be achieved by sensors described in U.S. Pat. No. 7,170,043 and in "A 100,000 fps Vision Sensor with Embedded 535 GOPS/W 256×256 SIMD Processor Array" (Carey et al. 2013). But both these two pixel designs require relatively complex in-pixel circuitry to compute the local spatial contrast, and therefore are not suitable to be integrated into a temporal contrast pixel.

Finally, US 2016/0093273 A1 describes an image sensor, wherein a cluster of N×N photoreceptors, each comprising a photodiode and a transducer, share a cluster-specific differentiator, which is an analog to digital encoding circuit. The objective of US 2016/0093273 A1 is to increase photodiode density on the chip without increasing the encoder circuit area through time-multiplexing the connection between different photoreceptors and encoders. The sensor described in US 2016/0093273 does not encode a static scene.

SUMMARY

It is an objective of the present invention to suggest a device, which is able to obtain both the temporal and the spatial visual contrast of a scene, while reducing the use of resources, in particular of chip area. It is a further objective of the invention to provide for more precise positioning and timing control to support gain and offset mismatch removal in post processing of the image signal.

This objective is met according to the present invention by providing an image sensor with the features of the claims, a sensor device with the features of claims, and a method with the features of the claims. Further advantageous embodiments of the invention are subject of the claims.

According to one aspect of the invention, the image sensor comprises multiple photovoltaic converters and multiple electronic converters. The photovoltaic converters are arranged in an array and the electronic converters are arranged in an array. Each of these arrays might e.g. be a one-dimensional array, or a two-dimensional array of any form, in particular a square, a hexagonal, or a triangular array. The photovoltaic converters and the electronic converters are linked by switching elements, which are configured to selectively connect photovoltaic converters with electronic converters.

In the following, the fact that the switching elements are arranged and configured to selectively connect a certain photovoltaic converter to a certain electronic converter may be expressed as the certain photovoltaic converter being linked by a switching element or able to be connected or connectable via a switching element to a certain electronic converter. Thus, according to the present invention, each photovoltaic converter is linked to an electronic converter by a switching element, forming a pair that generates a digital information dependent on intensity of light impinging on said photovoltaic converter. In this image sensor, at least two of the photovoltaic converters are linked by switching elements to one of said electronic converters. Furthermore, at least two of said electronic converters are linked by switching elements to one of said photovoltaic converters. The fact that an electronic converter is linked to a photovoltaic converter, or that a photovoltaic converter is linked to an electronic converter, by a switching element means that depending on the switching state of the switching element a signal generated by the photovoltaic converter either does or does not reach the electronic converter. In the former case, the photovoltaic converter will be said to be connected to the electronic converter by way of the switching element.

It should be noted that a connection in this context means that there is a conductive connection. That two photovoltaic converters can be connected or are connectable via switching elements to one electronic converter means that depending on the configuration of the switching elements, signal from one or from the other of the two photovoltaic converters reaches the electronic converter. Similarly, that two of electronic converters can be connected or are connectable via switching elements to one photovoltaic converter means that depending on the configuration of the switching elements, the signal from the photovoltaic converter is directed to the one or the other of the two electronic converters.

As explained above, the image sensor described in U.S. Pat. No. 7,728,269 B2 is able to encode the temporal contrast of the viewed image. By appropriately driving the switching elements, e.g. by allowing the signals from different photovoltaic converters to successively reach one single electronic converter, it is possible to translate spatial contrast into temporal contrast, thus allowing for the spatial contrast of the image to be obtained. In other words, depending on the correct control of the switching elements, the image sensor can either output a temporal image contrast or a spatial image contrast.

As explained above, the image sensor described in US 2016/0093273 A1 comprises a cluster of N×N photoreceptors, which share a cluster-specific encoding circuit. There is therefore an N×N-to-one mapping between photoreceptors and the encoder. The encoder is cluster-specific, which means that the clusters do not overlap in terms of their connection to the encoders. At any time, only a fraction of the total number of photodiodes is functioning, i.e. being encoded. In contrast, in the image sensor according to the present invention, multiple photovoltaic converters are linked to multiple electronic converters by switching elements. The objective is to allow every electronic converter to "look" at or receive signals from different photovoltaic converters, so that during the transition, they can encode the spatial contrast. While of the multiple photovoltaic converters only one may be actively connected to one of the electronic converters, the other photovoltaic converters may be connected to the other electronic converters. More importantly, the "field of view" of each electronic converter overlap each other when viewed over time, such that the spatial contrast of the whole scene can be encoded continuously without gaps. This continuity assumption is also used to identify and compensate any non-uniformity of the converter pairs, which is due to unavoidable physical limitations of semiconductor fabrication processes, thereby enabling a better reconstruction of the imaged scene.

The photovoltaic converter is a converter that performs a photon-to-electron conversion. The photovoltaic converter may be a photodiode, in particular a pinned photodiode (PPD). It may be configured to generate a current, a photocurrent, which is dependent, in particular linearly dependent or proportional, to the intensity of the light impinging on the photovoltaic converter. In contrast, the electronic converter is named as such, because it solely performs conversions between different electronic signals, or electron-to-electron conversions. In the following description, the electronic converter, rather than the photovoltaic converter, may be called a pixel. In particular, if the electronic converter comprises the signal converter and the encoder, then each signal converter/encoder pair can be regarded as a pixel of the image sensor.

The photovoltaic converter may also comprise a further electronic signal converter, which can be a current-to-current, a current-to-voltage, a voltage-to-current, or a voltage-to-voltage converter. The output of the signal converter can be dependent on the output of its input signal linearly, logarithmically or according to some other function. Therefore, in this case the output of the photovoltaic converter would be dependent on the light intensity input signal linearly, logarithmically or according to some other function. The function can in particular be a compressing function, such as a logarithmic function, in order to allow compressing a much wider range of input (e.g. corresponding to 6 decades of light intensity) into a relatively small electronic signal range (e.g. 100 mV).

Alternatively or cumulatively, the electronic signal converter or an additional electronic signal converter may be part of the electronic converter. In this embodiment, the output of the electronic signal converter is dependent on the output of the photovoltaic converter linearly, logarithmically or according to some other function. Thus, in an advantageous embodiment, said electronic converter of said pair comprises an electronic signal converter, which in combination with said photovoltaic converter of said pair is configured to generate an analog electronic signal dependent on light intensity on said photovoltaic converter. As an example, the photovoltaic converter performs a photon-to-electron conversion, generating an electric current. This current is converted to a voltage in a logarithmic current-to-voltage converter, which is part of the electronic converter. Then, this analog voltage signal, which is logarithmically dependent on the incident light, is converted into a digital signal, using an encoder, which is also a part of the electronic converter.

While it is possible to consecutively connect two signal converters, which are part of two photovoltaic converters, to a single electronic converter, which contains the encoder (i.e. the analog-to-digital converter), this embodiment has the following drawback: Each signal converter introduces noise. The signal converters are usually not identical, showing gain and offset mismatch. Therefore, if different signal converters are consecutively connected to the one encoder, the spatial contrast encoded in the digital encoder signal would contain the gain and offset mismatch, which cannot be removed from the digital signal anymore. The advantage of placing the signal converter inside the electronic converter is that now the two signals from the two photovoltaic converters are consecutively sent to the single electronic converter containing both the signal converter and the encoder. Now, although the encoded spatial contrast still contains the gain mismatch of the signal converter, the gain mismatch can be later compensated, because any two neighboring signal converters have converted a common relative spatial difference. Furthermore, there is no more offset mismatch, because the relative spatial difference between two photovoltaic converters stems from the same signal converter.

According to an advantageous embodiment, said encoder in the electronic converter is configured to convert said analog electronic signal to said digital signal using pulsed density modulation. A pulse density modulation based analog-to-digital encoder has the advantage to be compact enough so that it can be implemented in a pixel-parallel fashion, such that each pixel contain one such analog-to-digital encoder element.

According to a preferred embodiment, the image sensor is made of two semiconductor dies, which are fabricated separately and joined via interconnections. In particular, the signal converter, which may be part of the photovoltaic converter or part of the electronic converter, and the encoder, which is part of the electronic converter, may be arranged on the two separate semiconductor dies during the fabrication and then connected electrically via an interconnect between said two semiconductor dies.

Preferably, said switching elements are arranged and configured to time-multiplex said photovoltaic converters to an input of said electronic converter. This means that during a first time interval, the output signal of one photovoltaic converter is sent to the input of the electronic converter and during a consecutive second time interval, the output signal of the other photovoltaic converter is sent to the input of the electronic converter. If more than the two photovoltaic converters are linked to the one electronic converter by the appropriate number of switching elements, such as three, four or more, the time-multiplexing will work by driving the switching elements such that the photovoltaic converter will be switched to the electronic converter one after another. The time-multiplexing via the switching elements may be performed periodically.

Preferably, there are a number of first switching elements, which connect the same number of first photovoltaic converters to the corresponding electronic converters, a number of second switching elements, which connect the same number of second photovoltaic converters to the electronic converters, etc. All first switching elements may be driven simultaneously, in order to allow the output signals from the first photovoltaic converters to reach the corresponding electronic converters, and then all second switching elements may be driven simultaneously etc.

The driving signal for the switching elements may be generated by a switch controller connected to the image sensor. Therefore, in a further aspect of the invention, a sensor device for detecting time-dependent image data is proposed, comprising an image sensor as described herein and a switch controller connected to said switching elements of said image sensor and configured to generate switching signals to control said switching elements. The switch controller generating the switching signals can be a microcontroller, or a logic block implemented on the same chip as the image sensor. However, the switch controller is located outside the array of photovoltaic converters.

Any features mentioned with reference to the image sensor is equally advantageous in connection with the sensor device. In other words, if it is mentioned that the image sensor or components of it is/are configured to act in a certain way or to generate a certain signal, this can also mean that the switch controller is programmed appropriately in order to allow or ensure this to happen. E.g., the feature that said switching elements are arranged and configured to time-multiplex said photovoltaic converters to an input of said electronic converter, can equally be applied to the sensor device when the switch controller is configured to generate appropriate switching signals for driving the switching elements to perform that time-multiplexing.

According to an advantageous embodiment, said electronic converter is configured to generate digital information dependent on a relative difference or disparity between light intensities on two of said photovoltaic converters linked to said electronic converter by said switching elements. In other words, the digital information depends on a relative difference between a first intensity and a second intensity, where the first intensity is the intensity of light at the first photovoltaic converter and the second intensity is the intensity of light at the second photovoltaic converter. This way, the image sensor is able to obtain spatial contrast information of the sensed image. When the input of the electronic converter is switched from the first photovoltaic converter to the second photovoltaic converter, then the encoder output will be a digital signal of the difference between the signal converter output corresponding to the second intensity and the signal converter output corresponding to the first intensity. As will be explained further down, if the signal converter output is logarithmically dependent on the incident light, then this signal converter output difference is proportional to the contrast, or relative intensity difference, if the intensity difference is small with respect to the absolute intensity.

Advantageously, the at least two photovoltaic converters linked to the one of said electronic converters by said switching elements are arranged adjacent to each other in the array. This can also apply when more than two photovoltaic converters are linked to the one electronic converter by said switching elements. In particular, in a two-dimensional square array, four adjacent photovoltaic converters in a square are linked to the one electronic converter by switching elements. Accordingly, in a hexagonal or triangular array, the adjacent photovoltaic converters linked to the electronic converter by switching elements may be themselves arranged in a hexagon or triangle.

Advantageously, an adjacent electronic converter placed adjacent to said electronic converter is configured to generate at least one digital information dependent on a relative difference or disparity between light intensities on the same two photovoltaic converters, which are linked both to said electronic converter and said adjacent electronic converter by switching elements.

The spatial order of time-multiplexing between the photovoltaic converters and the electronic converters via the switching elements can be implemented in different schemes. Two such schemes will be discussed here, and in more detail further below, one which will be called a simultaneous double encoding scheme, and another, which will be called a spatially arranged scheme. While the image sensor will have to be configured to support any such scheme, the switch controller will have to be configured to generate the appropriate switching signals in order to drive the switching elements of the image sensor accordingly. It should be noted, however, that the image sensor can be fabricated and marketed separately.

According to the simultaneous double encoding scheme, said electronic converter and said adjacent electronic converter are linked to said two photovoltaic converters by two pairs of switching elements, whereby each said pair of switching elements is configured to be switched in the same manner. In other words, the relative intensity difference between light at two adjacent photovoltaic converters, and thus the relative spatial difference between them, is encoded by two adjacent encoders at the same time. With this scheme, the effect of motion artefacts can be reduced during post processing of the encoded digital information. More specifically, two pairs of switching elements may be arranged and configured to selectively connect said photovoltaic converter and said adjacent photovoltaic converter to said electronic converter and said adjacent electronic converter such that before a switching event, said photovoltaic converter is connected to said electronic converter and said adjacent photovoltaic converter is connected to said adjacent electronic converter, and after said switching event, said photovoltaic converter is connected to said adjacent electronic converter and said adjacent photovoltaic converter is connected to said electronic converter.

According to the spatially arranged scheme, said array of photovoltaic converters, said array of electronic converters and said switching elements are configured such that at any time a first photovoltaic converter and a second photovoltaic converter have the same relative distance as a first electronic converter and a second electronic converter, when the first photovoltaic converter is connected to the first electronic converter via a first active switching element and the second photovoltaic converter is connected to the second electronic converter via a second active switching element. This scheme allows a spatially correlated encoding, which means that every electronic converter, or pixel, and their connected photovoltaic converters have the same relative spatial position throughout all switching modus. This scheme is able to support spatial correlation based post processing on the image sensor output.

Advantageously, the number of photovoltaic converters is substantially equal to the number of electronic converters. This means that while two or more photovoltaic converters are linked to one electronic converter by switching elements, each of these two or more photovoltaic converters is in turn linked to the same number of electronic converters. In other words, the field of vision of one electronic converter may overlap the filed of vision of another, in particular adjacent electronic converter. Preferably, at any given time, the output signal of each photovoltaic converter is sent to one corresponding electronic converter. Only at the edge of the array, this might not be true.

Here, the qualifier "substantially" means that the number of photovoltaic converters and the number of electronic converters may vary by a small amount due to the geometric limits of the image sensor or other reasons. In particular, the discrepancy may be below 2%, 5% or 10%. The reason for such a discrepancy may be that photovoltaic converters at the edge of the array may not have the same number of electronic converters to be connected to as photovoltaic converters within the array. In particular, if the number of photovoltaic converters is $N^2$, the discrepancy may be in the order of 2/N.

Alternatively, the number of photovoltaic converters may be a multiple of the number of electronic converters. E.g., $N^2$ photovoltaic converters may be associated with a single electronic converter. In this case, in order to be able to implement the switching schemes and gain mismatch compensation described herein, it is necessary that adjacent electronic converters share one or more pairs of shared photovoltaic converters. That means that the shared photovoltaic converters are linked by switching elements to both of the adjacent electronic converters. One may say that the fields of view of the two adjacent electronic converters overlap by at least one pair of photovoltaic converters.

According to a further aspect of the invention, there is provided a method for obtaining image data compensated for gain mismatch. This compensation method has the following steps: In a first step, first digital information is obtained from a first electronic converter. This first digital information may in particular be encoded image data from two photovoltaic converters linked to the first electronic converter by switching elements. The first digital information includes first reference information dependent on a relative difference or disparity of light intensity on said two photovoltaic converters. Furthermore, second digital information is obtained from a second electronic converter. Similar to the first digital information, the second digital information may in particular be encoded image data from said two photovoltaic converters linked to the second electronic converter by switching elements. This second digital information includes second reference information, which also depends on a difference of light intensity on said two photovoltaic converters.

In the simultaneous double encoding scheme described above, the first and second digital information may be obtained at the same time, while in the spatially arranged scheme, the second digital information is obtained at a different time compared to the first digital information.

While the first reference information and the second reference information are both obtained from encoding the relative difference of light intensity on the same two photovoltaic converters, possibly with a different sign, they might differ due to gain mismatch between the first and second electronic converter. One may therefore obtain an adjustment factor from said first reference information and said second reference information and use it to compensate such a gain mismatch in said first and second digital information. This can be done either by taking the first electronic converter as a reference and adjusting said second digital information with the adjustment factor or by taking the second electronic converter as a reference and adjusting said first digital information with the adjustment factor.

In particular, the adjustment factor may be taken as a quotient of the first reference information and the second reference information. An example case for this compensation method is described in connection with FIG. 7 below.

BRIEF DESCRIPTION OF THE DRAWINGS

Some examples of embodiments of the present invention will be explained in more detail in the following description with reference to the accompanying schematic drawings, wherein.

DETAILED DESCRIPTION

The image sensor according to the embodiments described in the following comprise a two-dimensional rectangular array of photodiodes and transducer elements that transduce incident light intensities into analog voltage signals logarithmically, and a two-dimensional rectangular array of analog-to-digital encoder elements that encode the analog voltage signals as digital signals. Each photovoltaic converter therefore is formed as a photodiode, in particular as a PPD, while each electronic converter has a logarithmic current-to-voltage signal converter, called a transducer in the following, and an analog-to-digital converter, called an encoder, to convert an analog voltage level into digital information.

The image sensor encodes static scene spatial contrast by electronically time-multiplexing 4 adjacent photodiodes into the input of one transducer, thus converting static scene spatial contrast into temporal variations in the transducer element inputs, hence the temporal variations in the transduced analog signals. The encoders then encode said temporal variations using a pulse density modulation based scheme.

The mathematical relation between the logarithmic difference in the incident light intensities and the spatial contrast is explained by the formula $$\Delta[k \cdot \log(I)] \approx k \cdot \partial \log(I)/\partial I \cdot \Delta I = k \cdot \Delta I/I, \text{ if } \Delta I \text{ is small,}$$

where I is the incident light intensity and k is a constant gain. This formula shows that for a small spatial difference in incident light intensity $\Delta I$, the spatial contrast $\Delta I/I$ can be approximated by the spatial difference in the logarithmic value of the incident light intensity $\log(I)$.

If the sensor stops the time-multiplexing operation between the photodiodes and the transducers, then the temporal variations in the transduced analog signals correspond directly to the temporal contrast of the scene. Hence, without the time-multiplexing, the sensor encodes only the temporal contrast of the scene.

Figure 1:
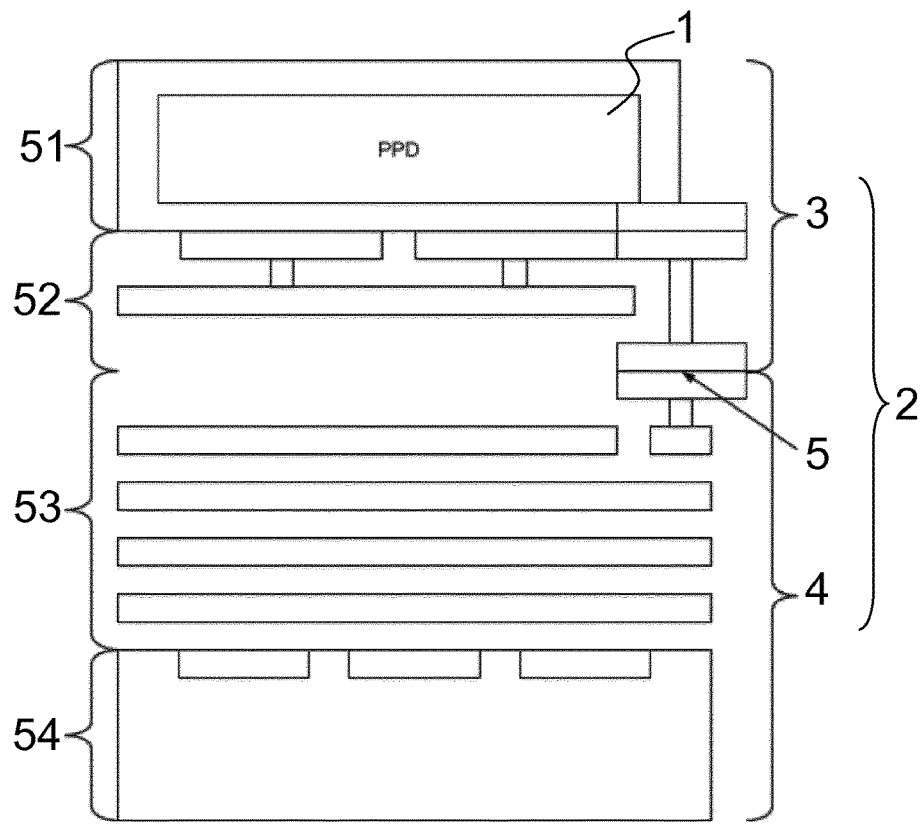
FIG. 1 shows a schematic cross-sectional view of a pixel in an image sensor comprising an electronic converter and a photovoltaic converter according to one preferred embodiment.

FIG. 1 illustrates an abstract cross-section view of a photodiode 1, a transducer 3 and an encoder 4. Note that the photodiode 1 is not part of the transducer 3, even though the reference bracket labelled "3" in FIG. 1 encompasses the photodiode 1 as well. The sensor utilizes pinned photodiodes (PPD). The use of PPDs minimizes the differences in the dark signal of the input to the transducer 3 and encoder 4 between different multiplexing time windows. The array of PPDs 1 and transducers 3 is fabricated on an image sensor process silicon die. The encoder 4 array is fabricated on a mixed signal process silicon die. The two dies are bonded via one interconnect 5 per transducer-encoder pair. As mentioned before, in the following, one transducer-encoder pair is called one pixel, which does not include a PPD, because at different moments during the time-multiplexing process, different PPDs are connected to the same pixel. While in the presently shown and discussed embodiment, the interconnect between the two dies is connecting the transducer to the encoder, there are other ways to distribute the circuit on one or two dies. As an example, the interconnect may be placed within the circuit for the encoder.

Also indicated in FIG. 1 are a silicon substrate 51 and metal layers 52 of the image sensor process silicon die as well as a silicon substrate 54 and metal layers 53 of the mixed signal sensor process silicon die.

Figure 2:
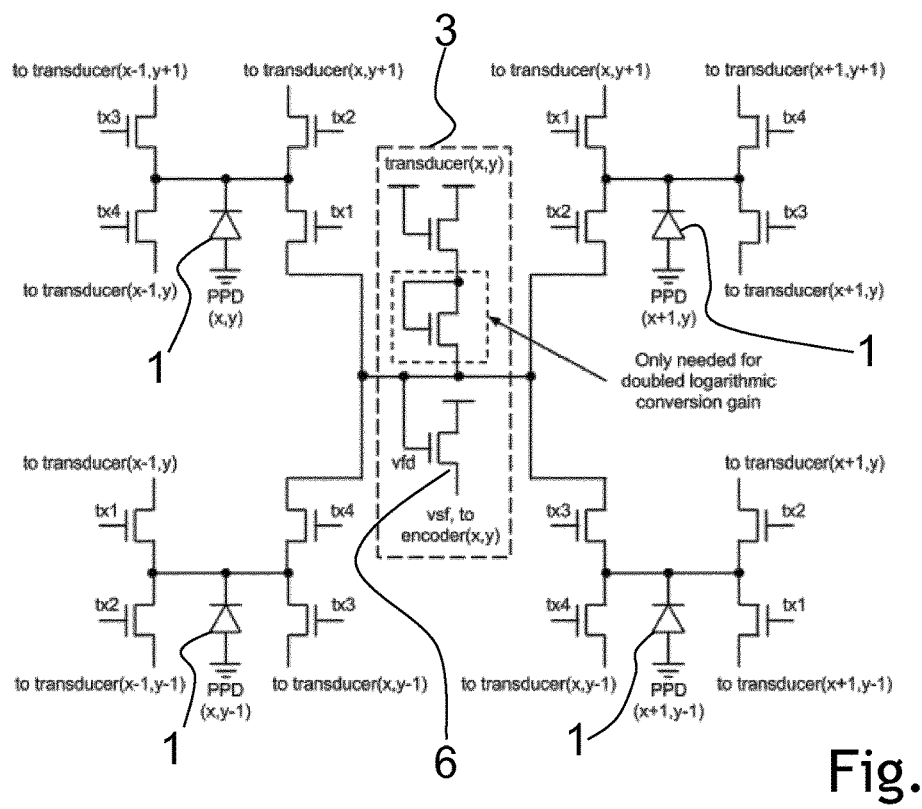
FIG. 2 shows a schematic of a signal converter linked to four photovoltaic converters by corresponding switching elements, according to one preferred embodiment.

FIG. 2 shows the circuit schematic of one transducer 3 and the four PPDs 1 it is linked to by the switching elements tx1, tx2, tx3, tx4. Each PPD 1 is further linked to three other electronic converters by said switching elements, which are not shown in FIG. 2.

The output of the transducer 3, the analog voltage signal vsf, is sent to the input of the corresponding encoder on the stacked mixed signal die, via the one-to-one interconnect 5. Each transducer 3 is linked to four neighboring PPDs 1 by the four switching elements, which are realized as transfer gates controlled by switching signals, and each PPD 1 is linked to four neighboring transducers 3 in the same way. The switching signals have to be provided by a switch controller, which is not shown in the figures. These switching signals will be described in connection with FIG. 4 further below. It should be noted that the switching elements with the same reference number receive or are driven by the same switching signal. E.g., the switching elements labelled "tx1" all receive the same switching signal, which can also be labelled tx1.

Figure 3:
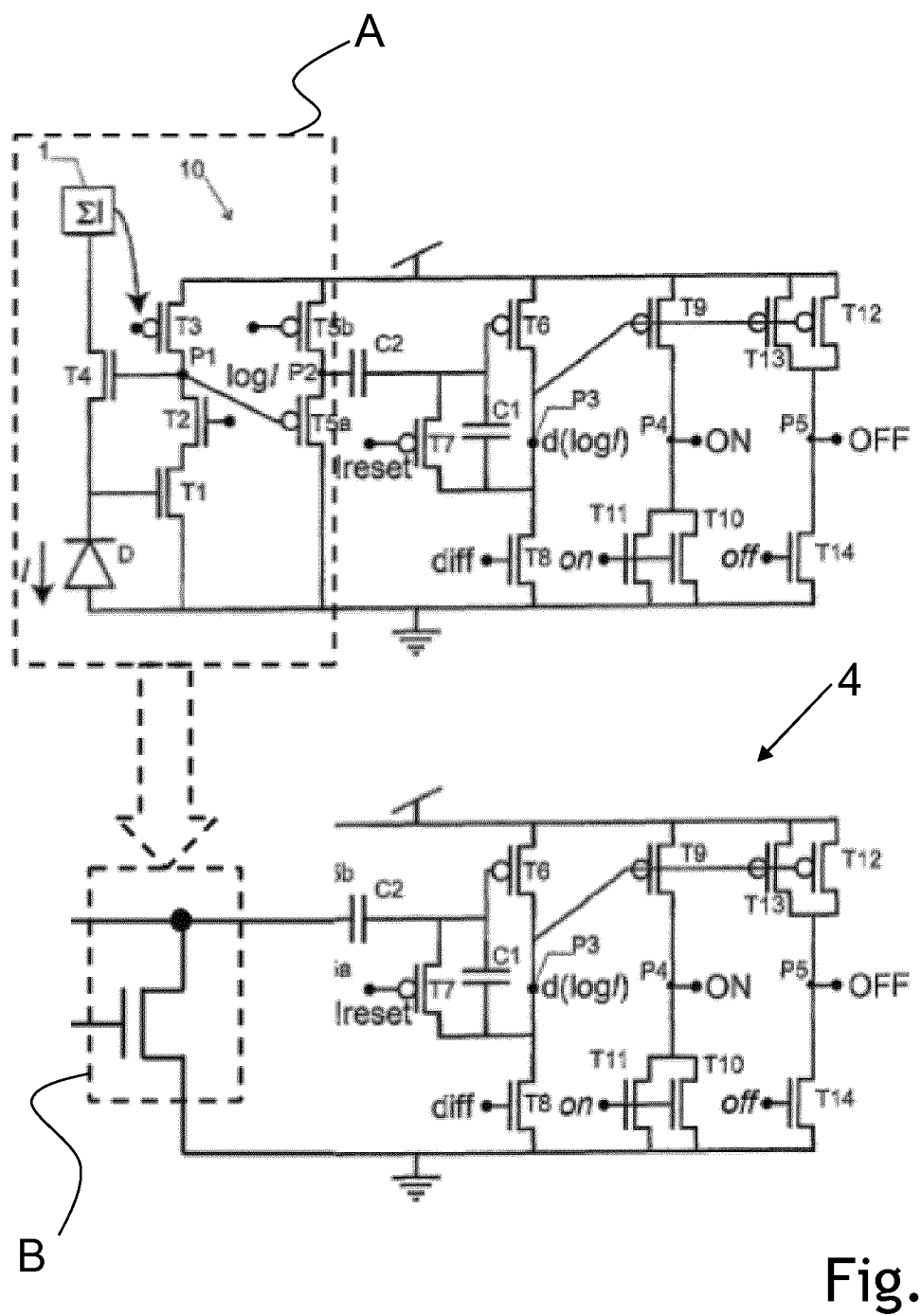
FIG. 3 shows a schematic circuit diagram of a signal converter and an encoder according to one preferred embodiment.

The encoder then converts the transducer 3 output, namely the analog signal vsf into a digital signal. Considering that the encoder element needs to be compact enough so that it can be implemented in a pixel-parallel fashion (i.e. each pixel contains 1 such analog-to-digital encoder element), a pulse density modulation based analog-to-digital encoder is a suitable choice. A pulse density modulation (delta modulation) based encoder is implemented in the prior art U.S. Pat. No. 7,728,269 B2, U.S. Pat. No. 9,631,974 and ATIS (Posch et al. 2010). FIG. 3 shows an example schematic of an encoder obtained by modifying the device described in U.S. Pat. No. 7,728,269 B2. The top circuit diagram in FIG. 3 is that of a cell of a photoarray taken from U.S. Pat. No. 7,728,269 B2. It comprises a photodiode D, four transistors T1-T4 forming a logarithmic amplifier, which is connected to an encoder through a voltage buffer, made of the two transistors T5a, T5b. The bottom circuit diagram in FIG. 3 shows a simplification of the circuit taken from U.S. Pat. No. 7,728,269 B2, by keeping the encoder 4, while replacing the photodiode D, amplifier T1-T4, and voltage buffer T5a, T5b (indicated with a dashed box A) with a transistor (indicated with a dashed box B) that forms a voltage buffer with the transistor 6 connected to vfd in the transducer 3 in FIG. 2.

At any moment, only one switching element tx, . . . , tx4 is switched on or active. Via this one switching element tx1, . . . , tx4, one transducer-encoder pair 3, 4 is connected to only one PPD, and one PPD is connected to only one transducer-encoder pair 3, 4. There might be exceptions for the PPDs at the edge of a 2D array, which may be connected to no transducer-encoder pair at some point in time. Hence, when the switching signals tx1, . . . , tx4 are kept constant, the image sensor is only encoding the temporal contrast of the scene, similar to the device describe in U.S. Pat. No. 7,728,269 B2.

Figure 4:
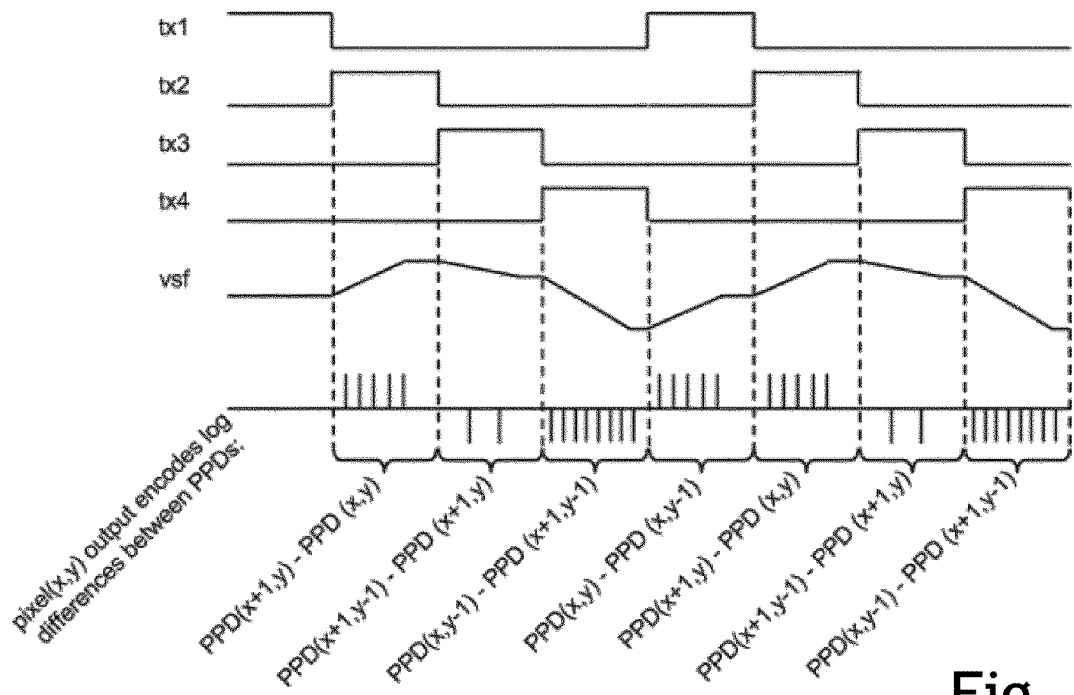
FIG. 4 shows a timing diagram of an exemplary encoder output in dependence of a series of switching signals according to one preferred embodiment.

FIG. 4 shows a timing diagram of the switching signals tx1, . . . , tw4 to perform the time-multiplexing. Throughout the time-multiplexing, 1-to-1 connection between a PPD 1 and a transducer-encoder pair 3, 4 is maintained. During the time-multiplexing, the encoder 4 outputs are encoded signals of the change in the logarithmic voltage vsf, which represents the logarithmic differences in photocurrents between adjacent PPDs 1, hence the spatial contrast. In other words, after one switching event, when a second switching element is switched off, and a first switching element is switched on, the encoder output corresponds to the difference between the logarithmic signal from the PPD connected via the second switching element and the logarithmic signal from the PPD connected via the first switching element.

The switching interval for switching from one switching element to the next switching element is adjustable, which determines the bit depth of the encoded spatial contrast. For example, if a short switching interval is chosen that allows a maximum of one pulse per pixel, then the encoded spatial contrast has only one gradient level. On the other hand, if the switching interval allows a maximum of 100 pulses per pixel, then the encoded spatial contrast has 100 possible gradient levels.

Within one time-multiplexing cycle, in which the active or on mode of the switching elements tx1, . . . , tx4 shift four times, the relative spatial difference between every two adjacent photodiodes 1 is transduced and encoded by two adjacent transducer-encoder pairs, and every two adjacent transducer-encoder pairs have encoded one relative spatial difference between the same two adjacent photodiodes 1.

Figure 5:
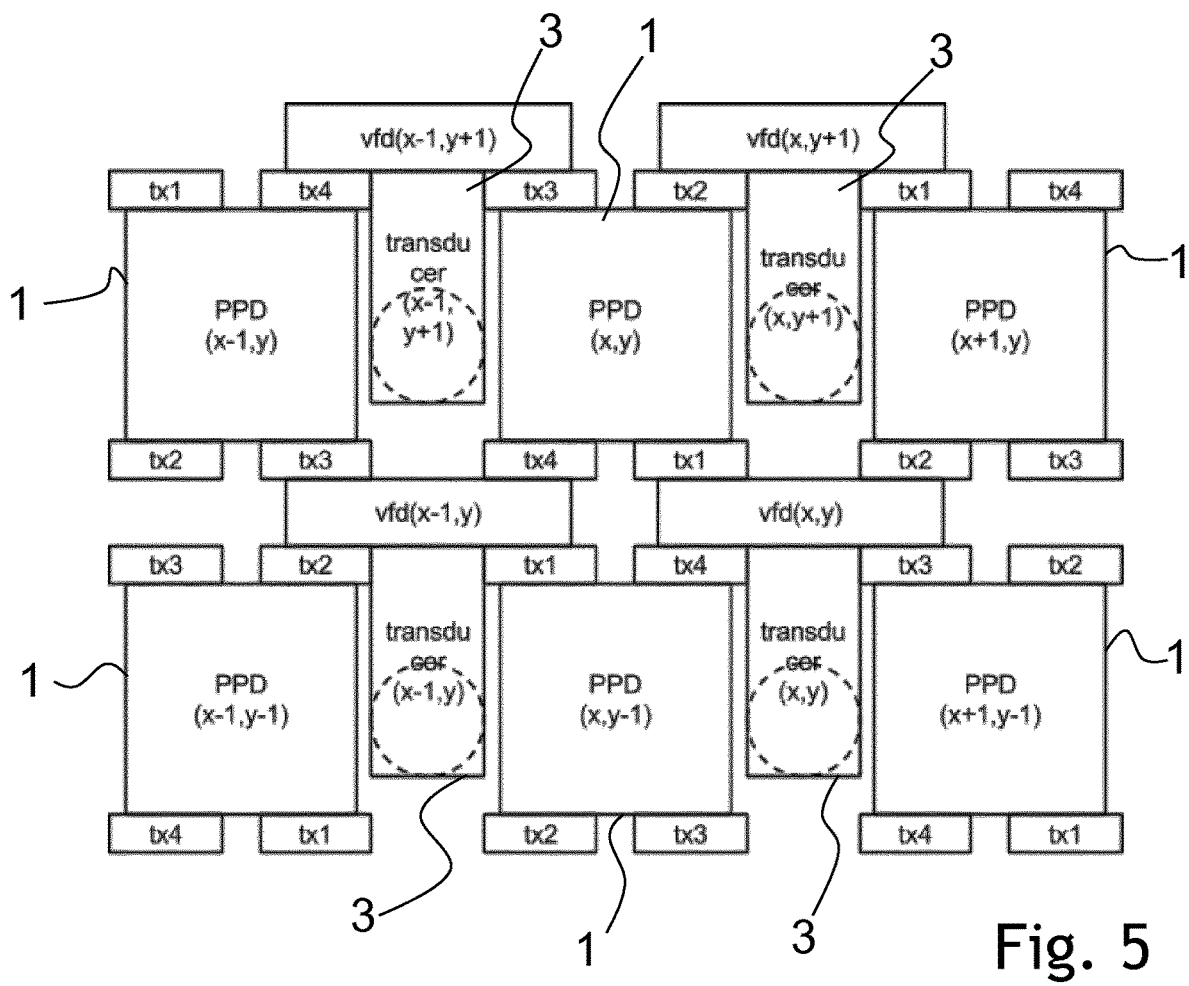
FIG. 5 shows a schematic layout of a photovoltaic converter array and an array of signal converters linked to them by switching elements on a semiconductor die according to one preferred embodiment.

FIG. 5 shows a schematic layout of a portion of an array of PPDs 1 and an array of transducers 3 linked to the PPDs 1 by switching elements tx1, . . . , tx4 on a semiconductor die, namely the image sensor process die. The junction leakage current introduced by the transducer 3 circuit remains constant throughout the time-multiplexing period. And because of the low dark current of the PPDs 1, multiplexing among different PPDs 1 introduces minimum offset noise caused by the differences in their dark signals. Hence, the temporal variation of each transducer's 3 output is able to represent the accurate spatial contrast in the PPD 1 array with minimum offset noise during the time-multiplexing process. Because only the PPD 1 array's spatial contrast is encoded instead of the absolute signal level, there is no offset mismatch at the transducer 3 stage either.

Figure 6:
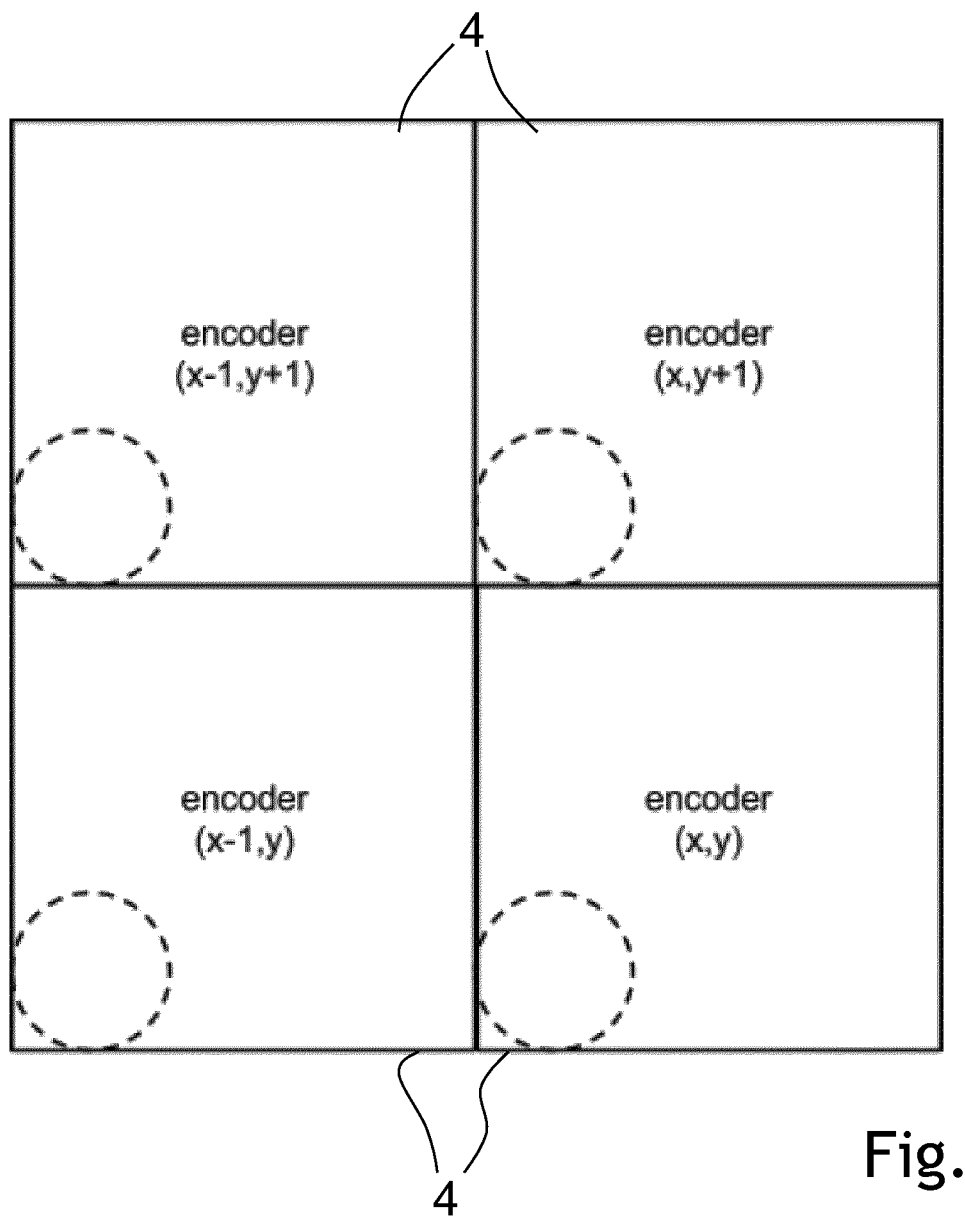
FIG. 6 shows a schematic layout of an electronic converter array on a further semiconductor die, which is connectable via interconnects to the die shown in FIG. 5.

FIG. 6 shows a schematic layout of an electronic converter array on a further semiconductor die, namely a mixed signal process die. The encoders 4 are placed in a 2D array matching the pitch of the transducers 3 on the image sensor process die shown in FIG. 5. The dashed circles in the FIG. 5 and FIG. 6 indicate the position of the interconnect between the two dies. Typically, the mixed signal process die adopts a much smaller node size than the image sensor process die, so that the same area on the mixed signal process die can contain more circuitry. The final pixel output from the encoder 4 contains fixed pattern noise caused by the gain mismatch in the transducer logarithmic conversion, and the gain mismatch due to the encoder quantization threshold variations. These gain mismatches can be removed in post processing.

Figure 7:
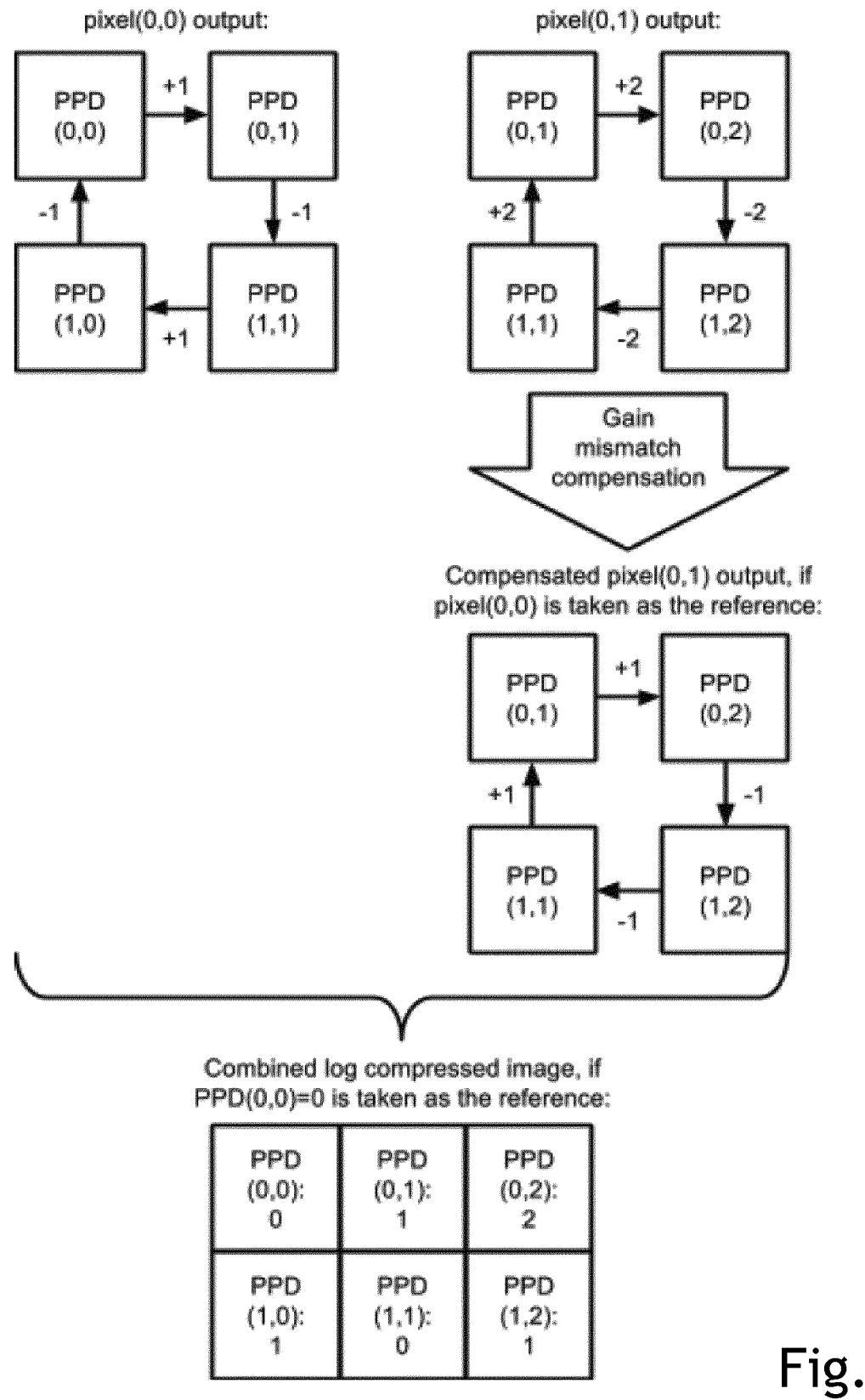
FIG. 7 shows a diagram for illustrating a post processing of the signal generated by the image sensor to compensate for gain mismatch according to one preferred embodiment.
Figure 8:
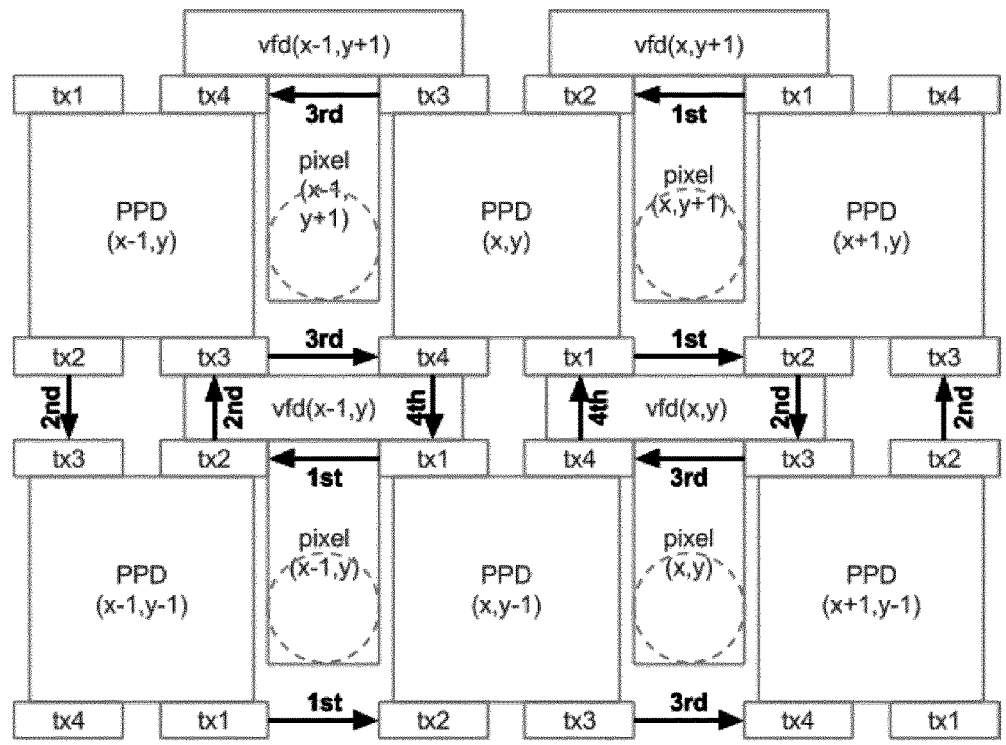
FIG. 8 shows a schematic layout of a photovoltaic converter array together with signal converters, and switching elements connecting them, arranged and driven according to a simultaneous double encoding scheme on a semiconductor die.
Figure 9:
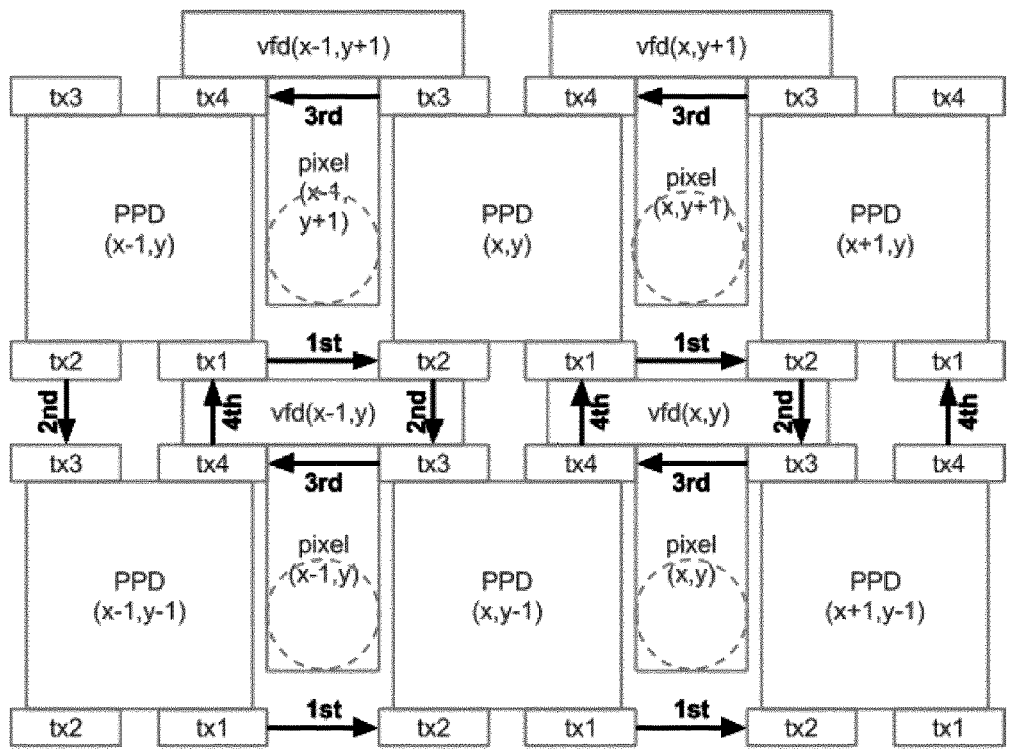
FIG. 9 shows a schematic layout of a photovoltaic converter array together with signal converters, and switching elements connecting them, arranged and driven according to a spatially arranged encoding scheme on a semiconductor die.

FIG. 7 shows a diagram for illustrating a post processing of the signal generated by the image sensor to compensate for gain mismatch. This simplified example is based on only two rows and three columns of PPDs 1 and two adjacent pixels, i.e. transducer-encoder pairs. The individual PPDs and the pixels in FIG. 7 and also in the following FIGS. 8 and 9 are identified by their coordinates (row, column) within their respective arrays. Therefore, the reference numbers used so far are omitted for the sake of visual clarity.

After one complete time-multiplexing cycle, the same spatial contrast between PPD(0,1) and PPD(1,1) is encoded by pixel(0,0) as −1 and by pixel(0,1) as 2 (the sign denotes the switching direction). Therefore, the gain mismatch between PPD(0,1) and PPD(1,1) can be derived as 1:2. With this information, if pixel(0,0) is taken as the reference, the spatial contrast output from pixel(0,1) is scaled by 0.5, hence the spatial contrast across the whole array can be computed with reference to pixel(0,1). And if PPD(0,0) assumes the value 0, the values of the whole array can be computed based on the scaled spatial contrast, which produces a logarithmically compressed image of the scene.

There are two possible schemes for arranging the spatial order of the switching elements tx1, . . . , tx4 during the time-multiplexing between the PPDs and the transducers: The simultaneous double encoding scheme shown in FIG. 8 and the spatially arranged encoding scheme shown in FIG. 9.

FIG. 8 shows a schematic layout of a photovoltaic converter array together with signal converters, and switching elements connecting them, arranged and driven according to a simultaneous double encoding scheme on a semiconductor die. This is the same scheme as shown in FIG. 5. Arrows labelled 1st, 2nd, 3rd, and 4th are introduced, which indicate the order of shifting of the on-mode of the switching elements. In both FIGS. 8 and 9 the switching order is following the diagram shown in FIG. 4. I.e., first the switching elements labelled tx1 are in an on modus, then those labelled tx2 etc.

Simultaneous double encoding means that the relative spatial difference between the same two adjacent PPDs is encoded by two pixels at the same time in the opposite directions. For example, at the 4th switching element on mode shift (from tx4 to tx1), pixel(x,y) encodes the spatial contrast from PPD(x,y−1) to PPD(x,y) and pixel(x−1,y) encodes the spatial contrast from PPD(x,y) to PPD(x,y−1). This scheme reduces the effect of motion artefacts in post processing gain mismatch removal.

Another way to describe the switching process of the simultaneous double encoding mode in view of FIG. 8 is to focus on two PPDs and two transducers and the pairs of switching elements connecting them selectively. For example, one may view a PPD (PPD(x,y)) and an adjacent PPD (PPD(x+1,y)) linked to a transducer (pixel(x,y)) and an adjacent transducer (pixel(x, y+1)) by two pairs of switching elements (labelled tx1 and tx2). Each pair of these switching elements is indicated with an arrow (labelled "1st"), representing a first ("1st") switching event and indicating that before the first switching event, the switching elements labelled tx1 are on, while the switching elements labelled tx2 are off, and after the first switching event, the switching elements labelled tx2 are on, while the switching elements labelled tx1 are off. Therefore, before the first switching event the PPD (PPD(x,y)) is connected to the transducer (pixel(x,y)) and the adjacent PPD (PPD(x+1,y)) is connected to the adjacent transducer (pixel(x,y+1)). Then, after the first switching event, the connections are reversed: Now the PPD (PPD(x,y)) is connected to the adjacent transducer (pixel(x, y+1)) and the adjacent PPD (PPD(x+1,y)) is connected to the transducer (pixel(x,y)).

FIG. 9 shows a schematic layout of a photovoltaic converter array together with signal converters, and switching elements connecting them, arranged and driven according to a spatially arranged encoding scheme on a semiconductor die. Spatially arranged encoding means that every pixel and their connected PPD have the same relative spatial position throughout the time-multiplexing. For example, before the 1st switching element on mode shift (from tx1 to tx2), pixel(x−1,y) is connected to PPD(x−1,y) and pixel(x,y) is connected to PPD(x,y), where pixel(x−1,y) is the left adjacent pixel of pixel(x,y), and PPD(x−1,y) is the left adjacent PPD of PPD(x,y). After the 1st switching element on mode shift, pixel(x−1,y) is connected to PPD(x,y) and pixel(x,y) is connected to PPD(x+1,y), where PPD(x,y) is still the left adjacent PPD of PPD(x+1,y), maintaining the same relative spatial position as pixel(x−1,y) and pixel(x,y). Because the relative spatial position of the spatial contrast encoded by the pixel array is constant throughout the time-multiplexing, this scheme is able to support spatial correlation based post processing on the pixel array output.

REFERENCE NUMERALS 1 photovoltaic converter, photodiode, PPD
2 electronic converter
3 signal converter, transducer
4 analog-to-digital converter, encoder
5 interconnect
6 output transistor
51, 54 silicone substrates
52, 53 metal layers
tx1, tx2, tx3, tx4 switching elements, transfer gates, switching signals

The invention claimed is:

1. An image sensor for detecting time-dependent image data, comprising multiple photovoltaic converters and multiple electronic converters arranged in arrays and linked by switching elements, whereby each of said photovoltaic converters and one of said electronic converters form a pair that generates digital information dependent on light intensity on said photovoltaic converter, and whereby said switching elements are arranged to selectively connect at least two of said photovoltaic converters to one of said electronic converters and at least two of said electronic converters to one of said photovoltaic converters, wherein three, four or more photovoltaic converters are linked to the one electronic converter by the appropriate number of switching elements, which are configured for time-multiplexing to be driven such that the photovoltaic converters will be switched to the electronic converter one after another.

2. The image sensor according to claim 1, wherein said electronic converter of said pair comprises an electronic signal converter, which in combination with said photovoltaic converter of said pair is configured to generate an analog electronic signal dependent on light intensity on said photovoltaic converter wherein said signal converter is configured such that said generated analog electronic signal is logarithmically dependent on the light intensity on the photovoltaic converter.

3. The image sensor according to claim 1, wherein said electronic converter is configured to generate a digital information dependent on a relative difference or disparity between light intensities on two of said photovoltaic converters.

4. The image sensor according to claim 3, wherein an adjacent electronic converter placed adjacent to said electronic converter is configured to generate at least one digital information dependent on a relative difference or disparity between light intensities on the same two photovoltaic converters, which are linked to both said electronic converter and said adjacent electronic converter by said switching elements.

5. The image sensor according to claim 3, wherein two pairs of switching elements are arranged and configured to selectively connect said photovoltaic converter and said adjacent photovoltaic converter to said electronic converter and said adjacent electronic converter such that before a switching event, said photovoltaic converter is connected to said electronic converter and said adjacent photovoltaic converter is connected to said adjacent electronic converter, and after said switching event, said photovoltaic converter is connected to said adjacent electronic converter and said adjacent photovoltaic converter is connected to said electronic converter.

6. The image sensor according to claim 3, wherein said array of photovoltaic converters, said array of electronic converters and said switching elements are configured such that at any time a first photovoltaic converter and a second photovoltaic converter have the same relative distance as a first electronic converter and a second electronic converter, when the first photovoltaic converter is connected to the first electronic converter via a first active switching element and the second photovoltaic converter is connected to the second electronic converter via a second active switching element.

7. The image sensor according to claim 1, wherein the number of photovoltaic converters is equal to, or a multiple of, the number of electronic Converters.

8. A sensor device for detecting time-dependent image data, comprising an image sensor according to claim 1 and a switch controller connected to said switching elements of said image sensor and configured to generate switching signals to control said switching elements.

9. A method of controlling the image sensor of claim 1 for detecting time-dependent image data, the image sensor comprising multiple photovoltaic converters and multiple electronic converters arranged in arrays and linked by switching elements, whereby each of said photovoltaic converters and one of said electronic converters form a pair that generates a digital information dependent on light intensity on said photovoltaic converter, and whereby said switching elements selectively connect at least two of said photovoltaic converters to one of said electronic converters, in such a way that signal from one or from another of the photovoltaic converters reaches the electronic converter, and selectively connect at least two of said electronic converters to one of said photovoltaic converters, wherein three, four or more photovoltaic converters are linked to the one electronic converter by the appropriate number of switching elements, which are driven such that the photovoltaic converters are switched to the electronic converter one after another by way of time-multiplexing.

10. A method according to claim 9 for obtaining image data compensated for gain mismatch, comprising the following steps;
   obtaining from a first electronic converter out of said array of electronic converters first digital information, including first reference information dependent on a relative difference of light intensity on two photovoltaic converters of said array of photovoltaic converters,
   obtaining from a second electronic converter out of said array of electronic converters second digital information, including second reference information dependent on a relative difference of light intensity on said two photovoltaic converters,
   compensating, in said first and second digital information, a gain mismatch between said first electronic converter and said second electronic converter by adjusting said first digital information and/or said second digital information with an adjustment factor obtained from said first reference information and said second reference information.

11. The image sensor according to claim 1, wherein said switching elements are arranged to selectively connect at least two of said electronic converters to one of said photovoltaic converters in such a way that the signal from the photovoltaic converter is directed to one or another of the electronic converters.

12. The image sensor according to claim 1, wherein said switching elements are configured to time-multiplex said photovoltaic converters to an input of said electronic converter such that during a first time interval, the output signal of one photovoltaic converter is sent to the input of the electronic converter and during a consecutive second time interval, the output signal of another photovoltaic converter is sent to the input of the electronic converter.

13. The image sensor according to claim 1, wherein a field of view of each electronic converter overlaps each other when viewed over time, wherein the field of view of each electronic converter are the different photovoltaic converters it receives signals from over time.

14. The image sensor according to claim 1, wherein said switching elements are configured such that while of the multiple photovoltaic converters only one is connected to one of the electronic converters, the other photovoltaic converters are connected to the other electronic converters.

* * * * *